(12) United States Patent
Betts

(10) Patent No.: US 7,054,377 B1
(45) Date of Patent: May 30, 2006

(54) SPACE DIVERSITY TRELLIS INTERLEAVER SYSTEM AND METHOD

(75) Inventor: William L. Betts, St. Petersburg, FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/534,696

(22) Filed: Mar. 24, 2000

Related U.S. Application Data

(60) Provisional application No. 60/171,026, filed on Dec. 15, 1999, provisional application No. 60/181,994, filed on Feb. 11, 2000.

(51) Int. Cl.
*H04L 5/12* (2006.01)

(52) U.S. Cl. .................. 375/265; 714/792; 714/794

(58) Field of Classification Search ............... 375/262, 375/265, 295, 296, 298; 714/786, 792, 794–796
See application file for complete search history.

(56) References Cited

U.S. PATENT DOCUMENTS

| | | | | |
|---|---|---|---|---|
| 4,677,625 A | | 6/1987 | Betts et al. ................ 371/43 |
| 5,638,408 A | * | 6/1997 | Takaki ................... 375/341 |
| 5,659,578 A | | 8/1997 | Alamouti et al. ............ 375/261 |
| 5,812,601 A | * | 9/1998 | Schramm ................ 375/262 |
| 6,088,387 A | * | 7/2000 | Gelblum et al. ............ 375/222 |
| 6,131,180 A | * | 10/2000 | Ramesh ................. 714/790 |
| 6,226,332 B1 | | 5/2001 | Agazzi et al. ............. 375/288 |
| 6,229,824 B1 | * | 5/2001 | Marko ................... 370/477 |
| 6,292,917 B1 | * | 9/2001 | Sinha et al. ............. 714/752 |
| 6,347,122 B1 | * | 2/2002 | Chen et al. .............. 375/262 |
| 6,445,750 B1 | * | 9/2002 | Chen et al. .............. 375/300 |
| 6,522,700 B1 | * | 2/2003 | Zimmermann et al. ..... 375/295 |

OTHER PUBLICATIONS

IEEE Std 802.3, 2000 Edition, Local and Metropolitan Area Networks, Physical Coding Sublayer (PCS), Physical Medium Attachment (PMA) sublayer and baseband medium, type 1000BASE-T, pp. 1078-1182.

* cited by examiner

*Primary Examiner*—Dac V. Ha
(74) *Attorney, Agent, or Firm*—Thomas, Kayden, Horstemeyer & Risley

(57) ABSTRACT

Several embodiments of a space diversity trellis interleaver system are provided for communicating data over a plurality of separate communication paths in order to inhibit distortion caused by impulse noise or other correlated noise and enhance the data transmission rate of data communications. The transmitter is designed to receive a plurality of data streams from data terminal equipment (DTE), which can be one or more devices. One or more convolutional encoders, preferably trellis encoders, encode each of the data streams. In an alternative embodiment, more than one trellis encoder is used to trellis encode each data stream. Data segments from the convolutionally encoded data streams are interleaved with a switch. The plurality of interleaved convolutionally encoded data streams are modulated and transmitted onto a respective plurality of separate communication paths. At the receiver, the plurality of data streams is received from the separate communication paths and demodulated. The data segments are de-interleaved with a switch, and then the de-interleaved data streams are convolutionally decoded with convolutional decoders, preferably trellis decoders. The de-interleaved convolutionally decoded data streams are communicated to one or more DTEs.

28 Claims, 8 Drawing Sheets

SPACE DIVERSITY TRELLIS INTERLEAVER SYSTEM AND METHOD

For this application, the inventor claims priority to and the benefit of the following provisional applications: (a) provisional application entitled, "Space Diversity Trellis Interleaver," filed on Dec. 15, 1999, assigned Ser. No. 60/171,026, and incorporated herein by reference, and (b) provisional application entitled, "Space Diversity Trellis Interleaver," filed on Feb. 11, 2000, assigned Ser. No. 60/181,994, and incorporated herein by reference. The invention is also the subject of a contribution entitled, "G.shdsl: 4-Wire Space Diversity Convolutional Encoding" (T1E1.4/2000-087) and submitted by the inventor in February 2000 to a standards committee of the International Telecommunications Union (ITU) to assist same, which document is also incorporated herein by reference.

FIELD OF THE INVENTION

The present invention generally relates to communications and modems, and more particularly to a space diversity trellis interleaver system and method for efficiently minimizing noise distortion and enhancing the data transmission rate of communications.

BACKGROUND OF THE INVENTION

Communications devices, particularly those that implement digital subscriber line (DSL) technologies (e.g., T1 and xDSL, including SDSL, HDSL, ADSL, etc.), transmit high speed data using analog signals over telephone connections, which are typically copper wire pairs. The connections and equipment are subject to adverse impulse noise. Impulse noise events are likely correlated over several symbol (or baud) periods of the DSL modulation. Correlated noise or distortion undesirably will significantly degrade performance of the decoder associated with a receiver.

In order to minimize the adverse affects of noise, various forward error correction coding techniques (also known as convolutional coding) have been developed and employed in the past. Typically, in forward error correction coding, at the transmitter, data bits are encoded by adding redundant bits systematically to the data bits so that, normally, only predetermined transitions from one sequential group of bits (corresponding to a symbol, or baud) to another are allowed. There is an inherent correlation between these redundant bits over consecutive bauds. At the receiver, each baud is tentatively decoded and then analyzed based on past history, and the decoded bits are corrected, if necessary.

One well known and widely accepted error coding technique is trellis coded modulation (TCM), which is a form of convolutional coding that is optimized according to a specific modulation scheme. A TCM encoder is situated at the transmitter, and a TCM decoder is situated at the receiver. TCM is highly desirable since it combines the operations of modulation and error coding to provide effective error control coding without sacrificing power and bandwidth efficiency. TCM essentially averages the noise over more than one of the symbols. Noise, which is correlated over the constraint length of the trellis code, will effectively degrade performance. In many cases, correlated noise causes the trellis decoder to perform worse than if the receiver employed no trellis coding at all.

As examples, U.S. Pat. No. 5,659,578 to Alamouti et al. and U.S. Pat. No. 4,677,625 to Betts et al. describe the concept of TCM. The latter describes a distributed trellis encoder that can be used to spread symbols associated with a data stream over time across successive symbol (baud) periods. This distributed encoder significantly improves performance by making the transmissions less susceptible to errors resulting from imposition of correlated noise.

DSL technologies are still in a state of infancy and are being improved over time by engineers and designers. The industry still needs ways to further enhance DSL communications and, in particular, ways to minimize the adverse effects of impulse noise.

SUMMARY OF THE INVENTION

The present invention provides a space diversity trellis interleaver system and method for efficiently minimizing noise distortion and enhancing the data rate of communications. The system involves interleaving data segments across a plurality of separate communication paths.

Briefly described, in architecture, the space diversity trellis interleaver system can be implemented as follows. A transmitter is designed to receive a plurality of data streams from data terminal equipment (DTE), which can be one or more devices. One or more convolutional encoders, preferably trellis encoders, encode each of the data streams. In an alternative embodiment, more than one trellis encoder is used to trellis encode each data stream. Data segments from the convolutionally encoded data streams are interleaved with a switch. The plurality of interleaved convolutionally-encoded data streams are modulated and transmitted onto a respective plurality of separate communication paths.

At a receiver, the plurality of data streams is received from the separate communication paths and demodulated. The data segments are de-interleaved with a switch, and then the de-interleaved data streams are convolutionally decoded with convolutional decoders, preferably trellis decoders. The de-interleaved convolutionally decoded data streams are communicated to one or more DTEs.

In accordance with another feature of the present invention, distributed trellis coding can be employed to further minimize noise distortion.

In accordance with yet another feature of the present invention, a differential delay can be imposed among the plurality of channels to further minimize noise distortion.

The present invention can also be viewed as providing several novel methods for enhancing data communication. Broadly summarized, one such method, for implementation in connection with a transmitter, can be stated as follows: receiving a plurality of data streams; convolutionally encoding each of the data streams of the plurality; interleaving data segments from the convolutionally encoded data streams; and transmitting the interleaved convolutionally-encoded data streams onto a plurality of separate communication paths. Another such method, for implementation in connection with a receiver, can be stated as follows: receiving a plurality of data streams from separate communication paths; de-interleaving data segments from the convolutionally encoded data streams; and convolutionally decoding each of the de-interleaved data streams of the plurality.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The space diversity trellis interleaver system (and associated method(s)) of the present invention will be specifically described hereafter in the context of four possible preferred embodiments, each with a transmitter and a receiver, which are intended to be possible nonlimiting examples of implementations. Numerous other embodiments are envisioned and are possible, as will be apparent to those with skill in the art.

The space diversity trellis interleaver system of the present invention allows trellis coding among a plurality (one or more) of distinct separate transmission paths. Although not limited to this particular application and this particular number of communication paths, the space diversity trellis interleaver system is particularly suited for use in connection with modems at opposing ends of two different telephone connections (wire pairs) extending between a central office (CO; defined as any facility having a telephone switch) associated with a telephone company and a customer premises (CP). The modems can employ any suitable modulation scheme, for example but not limited to, that prescribed by the industry standard V.34 that has been promulgated by the International Telecommunications Union (ITU). Many CPs already have two-wire pairs connecting them to the CO. The space diversity trellis interleaver system can effectively average the noise on the plurality of communication paths, for example, two different wire pairs, yielding better performance and longer DSL reach between the CO and CP equipment. In some cases, the space diversity trellis interleaver system provides data throughput where none was possible otherwise.

Note that in the preferred embodiments, as described hereafter, the transmitters and receivers can be implemented in hardware, software, firmware, or a combination thereof. Preferably, all of the component parts of each, except the amplifier and transformer elements, are implemented in firmware that is stored in a memory (EPROM) and that is executed by a suitable instruction execution system, particularly, a digital signal processor (DSP) or general purpose microprocessor. The software/firmware can be stored and transported on any computer readable medium. If implemented in hardware, in whole or in part, as in alternative embodiments, the hardware components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

I. First Embodiment

Figure 1:
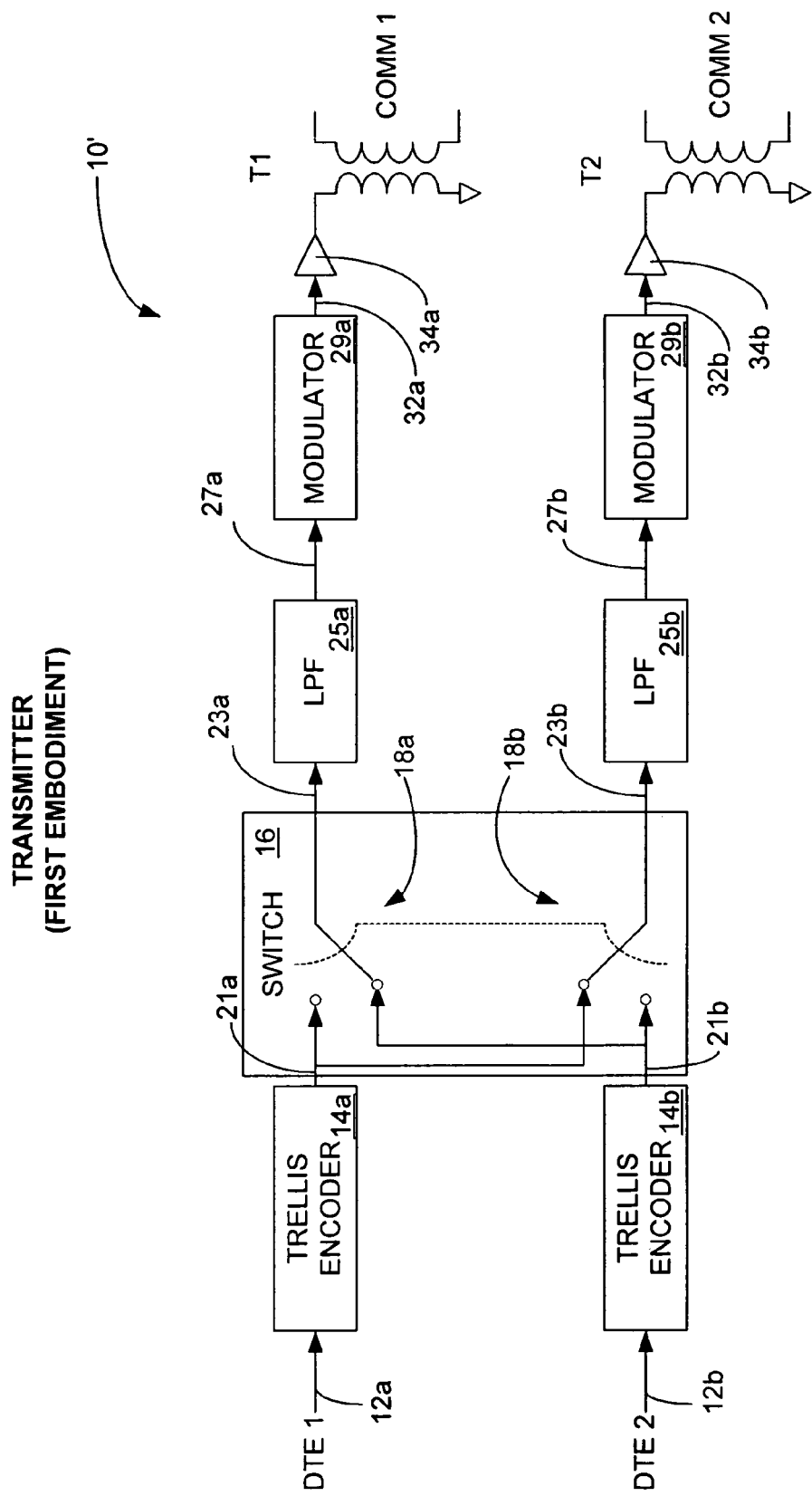
FIG. 1 is a block diagram of a first embodiment of a transmitter that employs the space diversity trellis interleaver system of the present invention.
Figure 2:
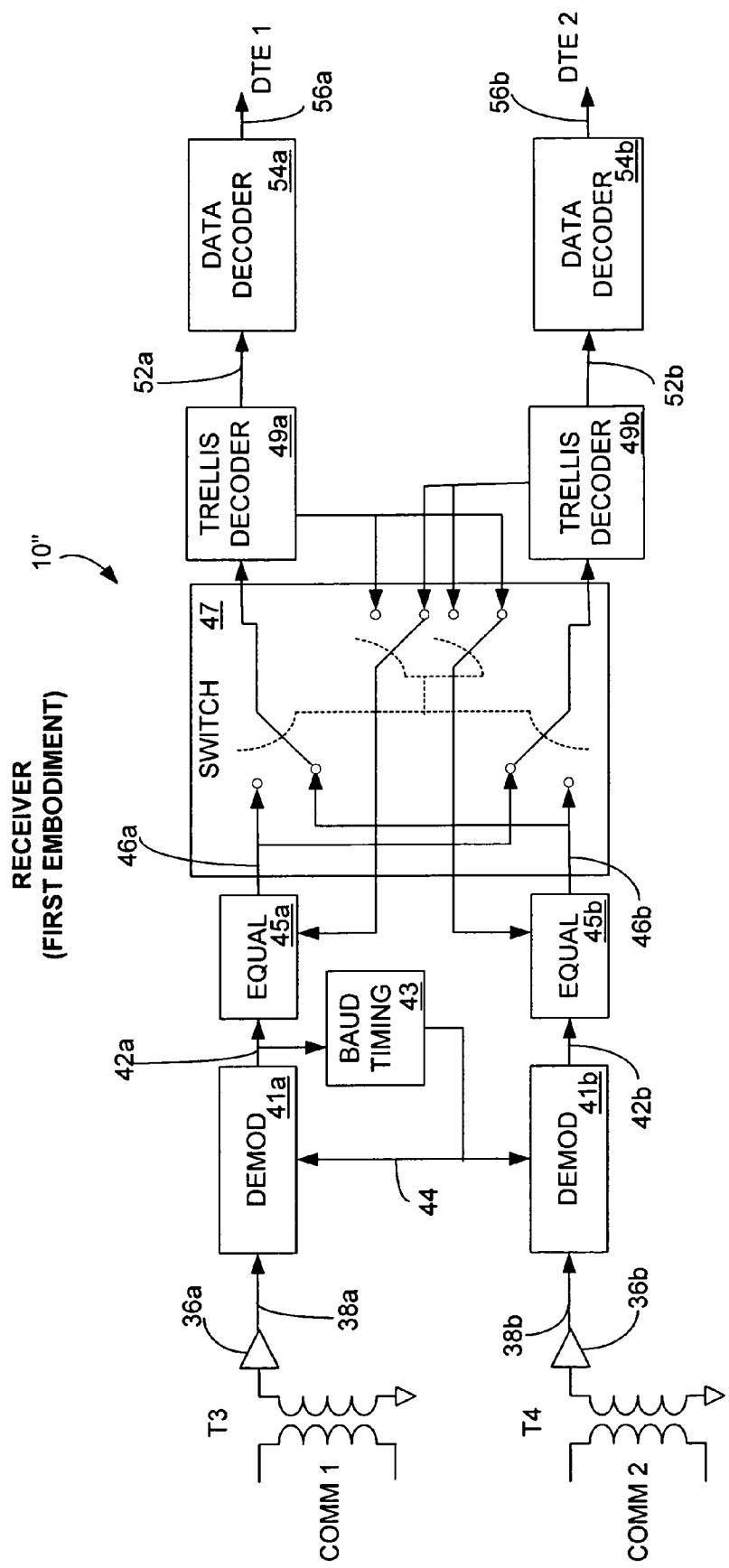
FIG. 2 is a block diagram of a first embodiment of a receiver that can be used in connection with the transmitter of FIG. 1.

FIGS. 1 and 2 illustrate a transmitter 10' and a receiver 10", respectively, in accordance with a first embodiment of the space diversity trellis interleaver system.

With reference to FIG. 1, the transmitter 10' receives two data streams 12a, 12b associated with channels 1, 2 from data terminal equipment (DTE), namely, DTE1, DTE2, respectively. Each of the data streams 12a, 12b is passed through a respective trellis encoder 14a, 14b. Trellis encoders are well known in the art and need not be described in any further detail. Although not limited to this particular configuration, in the preferred embodiments, the trellis encoders and decoders are designed in accordance with the ITU industry standard V.34.

A switch 16 is designed to actuate switching elements 18a, 18b concurrently after each baud (or symbol period), which corresponds to a trellis symbol and which corresponds to a data symbol or fraction thereof (if, optionally, fractional rate encoding is employed). In essence, the trellis symbols from trellis encoders 14a, 14b are interleaved on each of connections 23a, 23b. More specifically, as is shown in FIG. 1 by the illustrated posture of switching elements 18a, 18b, during one baud period, trellis encoder 14a communicates a trellis symbol at output 21a to the low pass filter (LPF) 25b, while the trellis encoder 14b communicates a trellis symbol at output 21b to the LPF 25a. Then, during the next successive baud period, the trellis encoder 14a communicates the next successive trellis symbol at output 21a to the LPF 25a, while the trellis encoder 14b communicates the next successive trellis symbol at output 21b to the LPF 25b.

Note that in the preferred embodiments, the switch 16 is implemented in firmware/software, but it could also be implemented in hardware.

The LPFs 25a, 25b are optional filters but are recommended in accordance with good design practice. As is known in the art, they could also be designed as bandpass filters of a suitable form.

Modulators 29a, 29b (or spectral shapers in the case of CAP modulation) receive the respective data 27a, 27b from respective LPFs 25a, 25b. The modulators 29a, 29b can implement a variety of modulation technologies, including but not limited to, the following well known modulation techniques: quadrature amplitude modulation (QAM), carrierless amplitude phase (CAP) modulation, pulse amplitude modulation (PAM), phase shift keying (PSK), frequency shift keying (FSK), etc. In the preferred embodiments, the modulators 29a, 29b are designed to implement QAM in accordance with the V.34 standard. In this case, the modulators 29a, 29b are designed to encode the incoming digital data onto an analog waveform. Accordingly, the modulators 29a, 29b produce analog QAM signals at the baud period corresponding to the digital trellis-coded constellation points that are input to the modulators 29a, 29b.

Drivers 34a, 34b, for example but not limited to, amplifiers, receive the QAM signals 32a, 32b, respectively, and forward them to suitable separate respective communication paths, for example but not limited to, two-wire communication connections COMM1, COMM2, via corresponding transformers T1, T2. Thus, each connection COMM1, COMM2 receives a stream of trellis symbols that are interleaved and originate from the upper (channel 1) and lower (channel 2) signal processing paths of FIG. 1. Furthermore, as is known in the art, transformers T1, T2, as well as the others mentioned hereafter, can be implemented as part of a hybrid, which is used to combine (at the transmit end) or separate out (at the receive end) transmit and receive signals on a single communication connection, for example, COMM1 or COMM2. Also, as is known in the art, there are transformerless implementations and such implementations could be utilized.

As shown in FIG. 2, the transceiver 10" includes transformers T3, T4, connected to respective the communication connections COMM1, COMM 2 in order to receive the analog signals from the transmitter 10' (FIG. 1).

Amplifiers 36a, 36b receive the analog signals and forward them onto respective demodulators 41a, 41b. In the preferred embodiment, the demodulators 41a, 41b are QAM demodulators, which generate an in-phase signal and a quadrature-phase signal.

Baud timing mechanism 43 is designed to ensure that the symbol rate between the demodulators 41a, 41b is in synchronization. The baud timing mechanism 43 derives a clock signal 44 based upon sampling the demodulated output 42a from demodulator 41a. Other timing schemes are possible. In fact, each of the demodulators 41a, 41b may have separate baud timing mechanisms.

Equalizers 45a, 45b, which are optional but preferred components, receive the demodulated digital data 42a, 42b, respectively. The equalizers 45a, 45b are well known in the art and essentially condition the data to compensate for signal distortion and delay on the communication channels COMM1, COMM2. Equalization attempts to maintain the amplitude and phase characteristics of the signal so that it remains true to the original.

The switch 47 essentially de-interleaves the interleaved trellis symbols received from the separate communication paths 46a, 46b. More specifically, during one baud period, equalizer 45a provides a trellis symbol at output 46a to the trellis decoder 49b (as shown in FIG. 2), while the equalizer 45b provides a trellis symbol at output 46b to the trellis decoder 49a (as shown in FIG. 2). Moreover, during the next baud period, the equalizer 45a provides the next successive trellis symbol at output 46a to the trellis decoder 49a, while the equalizer 45b provides the next successive trellis symbol at output 46b to the trellis decoder 49b.

The architecture, functionality, and operation of the trellis decoders 49a, 49b are well known in the art and need not be described in detail here for simplicity. Essentially, the trellis decoders 49a, 49b decode the respective series of trellis symbols that are input to each into data symbols. An example of a trellis decoder that can be employed in the various embodiments described in this document is one that employs the well known Viterbi algorithm.

The data decoders 54a, 54b are preferably well known QAM decoders that are designed to select a point (represents a symbol defined by a number of bits) on a predefined signal constellation closest to the actual point corresponding to the received signals. The data decoders 54a, 54b produce a data word at respective outputs 56a, 56b corresponding with each data symbol for respective data terminal equipment DTE1, DTE2.

II. Second Embodiment

Figure 3:
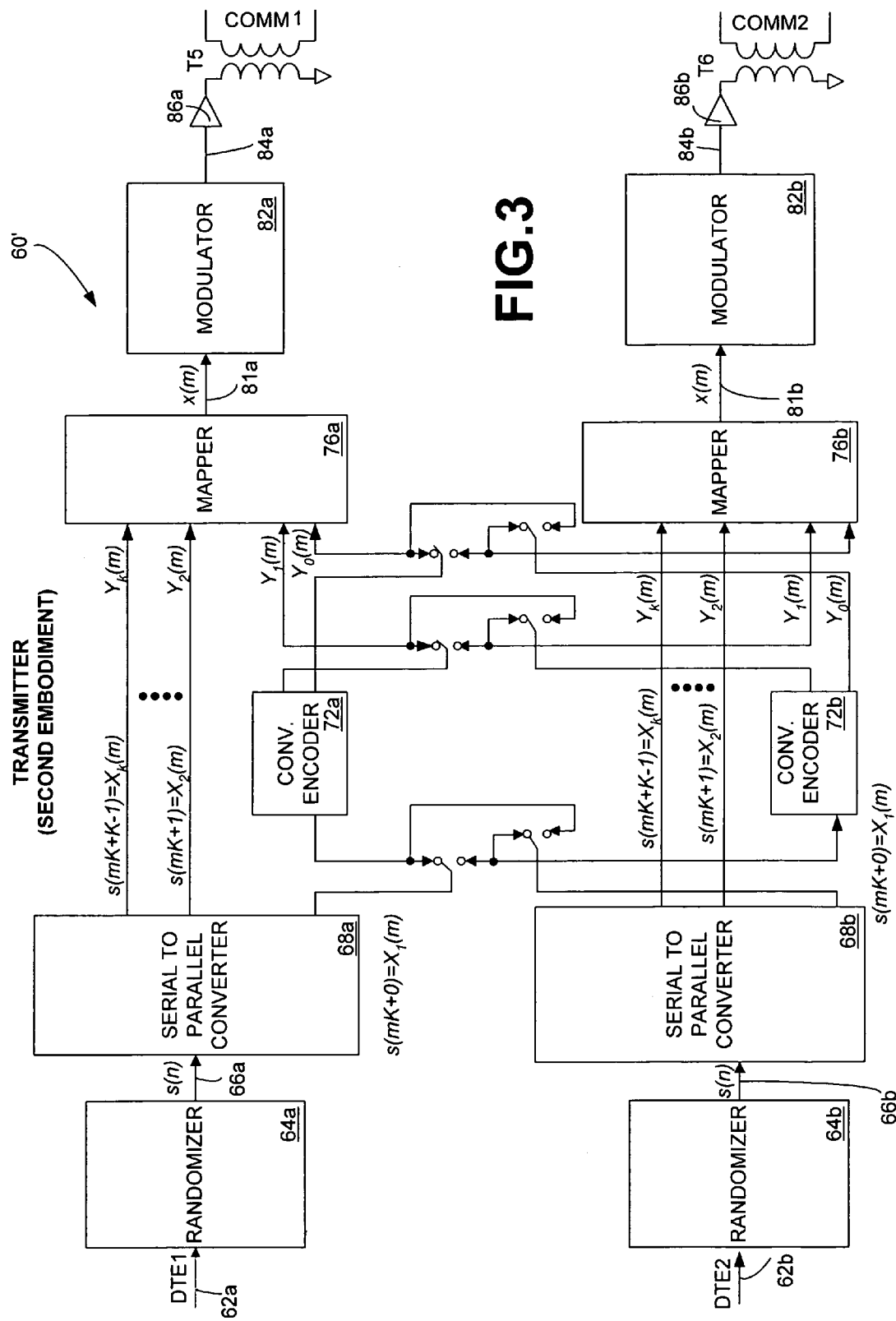
FIG. 3 is a block diagram of a second embodiment of a transmitter that employs the space diversity trellis interleaver system of the present invention.
Figure 4:
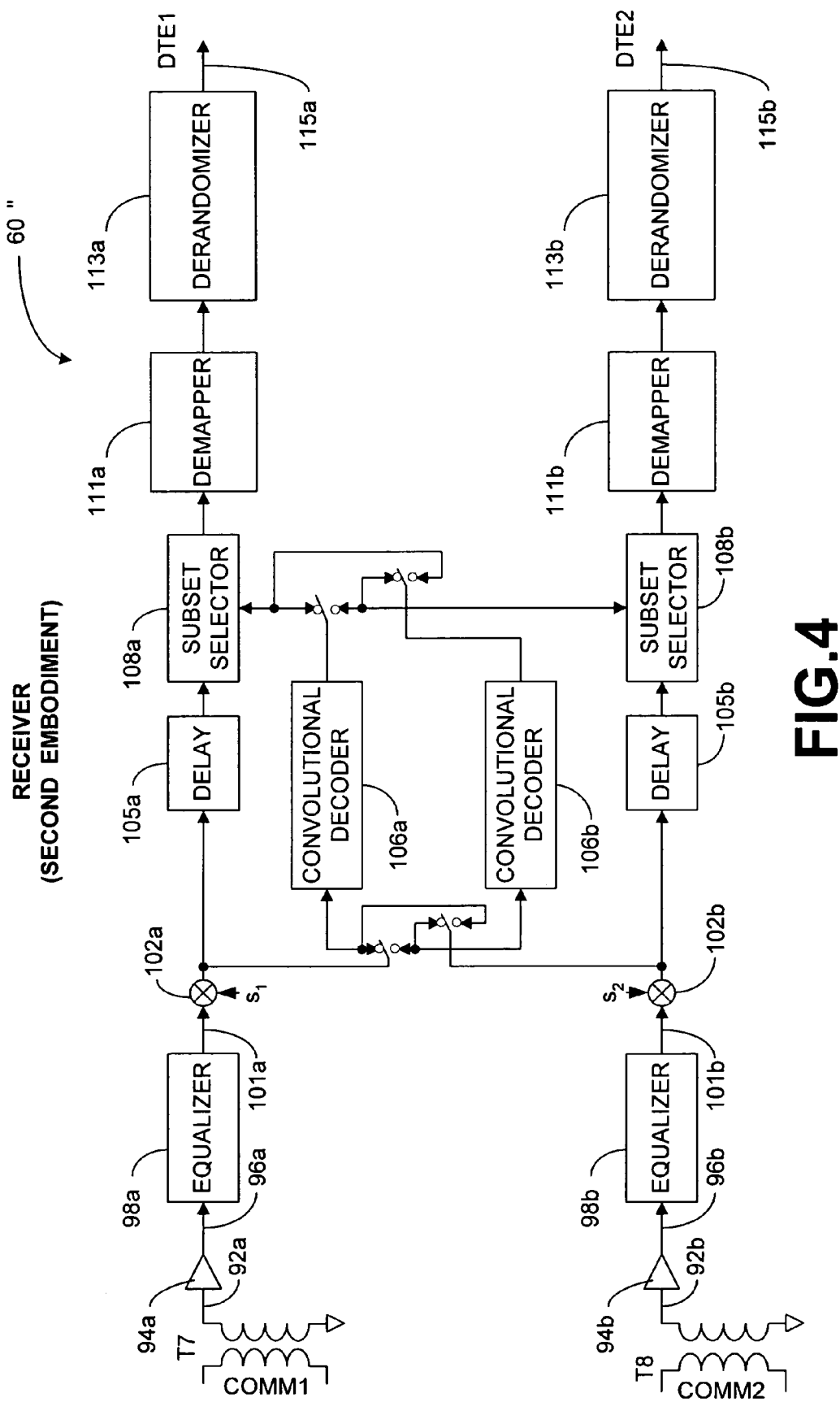
FIG. 4 is a block diagram of a second embodiment of a receiver that can be used in connection with the transmitter of FIG. 3.

A second embodiment of the space diversity trellis interleaver system of the present invention is illustrated in FIGS. 3 and 4. FIGS. 3 and 4 illustrate a transmitter 60' and a receiver 60", respectively, for implementing this second embodiment. An advantage of this second embodiment is that the data rates on the communication connections COMM1, COMM2 can be separately and independently regulated and changed, whenever appropriate, depending upon the noise conditions of each connection. The rates are changed via a data throttling, mapping, or other operation in connection with each communication path. As an example, on one path, a mapping operation could be used to define each symbol with 8 bits, whereas on the other noisier communication path the mapping could be set to define each symbol with 6 bits. Accordingly, the data rate of the former would be faster than the data rate of the latter, and the data rates can be independently changed, upon initialization or dynamically, to suit the particular channel noise conditions.

With reference to FIG. 3, the transmitter 60' includes randomizers 64a, 64b for receiving data from DTE1, DTE2, respectively. The randomizers 64a, 64b each scramble their respective data streams by scrambling the bits in a preselected pattern and by generating randomized bits that are passed to the next stage of signal processing. The foregoing functionality is well known in the art.

Serial-to-parallel (S/P) converters 68a, 68b receive the scrambled data streams from randomizers 64a, 64b, respectively. Each of the S/P converters 68a, 68b provide parallel bits defining a data symbol during each baud period. Part of the symbol is communicated to one of the convolutional encoders 72a, 72b, while the remaining part is communicated to one of the mappers 76a, 76b.

During one baud period, and as is shown in FIG. 3, the symbol on output $X_1(m)$ from S/P converter 68a is routed to convolutional encoder 72a and the symbol on output $X'_1(m)$ from S/P converter 68b is routed to convolutional encoder 72b. The output of convolutional encoder 72a is routed to input $Y_o(m)$ and input $Y_1(m)$ of the mapper 76a and the output of convolutional encoder 72b is routed to input $Y'_o(m)$ and input $Y'_1(m)$ of the mapper 76b.

During the next successive baud period, the symbol on output $X_1(m)$ from the S/P converter 68a is routed to the convolutional encoder 72b and the symbol on output $X'_1(m)$ from the converter 68b is routed to the convolutional encoder 72a. The output of the convolutional encoder 72b is routed to the input $Y_o(m)$ and the input $Y_1(m)$ of the mapper 76a, and the output of the convolutional encoder 72a is routed to the input $Y'_o(m)$ and the input $Y'_1(m)$ of the mapper 76b. The S/P converters 68a, 68b accept a constant number of bits per symbol, specifically, $B_1$ for channel 1 and $B_2$ for channel 2, where $B_1$ and $B_2$ can be equal or unequal.

In this configuration, only the convolutional encoders 72a, 72b and their respective decoders (FIG. 4) are switched between the channels.

Mappers 76a, 76b can independently and separately adjust the data rate on outputs 81a, 81b. The mappers 76a, 76b map the bits defining each convolutional symbol that is received to another set of bits, typically a greater number. Further, the mapped bits usually are less susceptible to attenuation and distortion than the unmapped bits. Mappers 76a, 76b can be implemented, for example but not limited to, with a shell mapper or modulus converter, which are well known in the art. Optionally, the mappers 76a, 76b can be configured to implement fractional rate encoding. The mappers 76a, 76b can be controlled with any suitable mechanism, for instance, a state machine or processor.

In essence, in this configuration, trellis encoding can be implemented by the convolutional encoders 72a, 72b acting in combination with the mappers 76a, 76b, depending upon the mappings employed by the mappers 76a, 76b.

Modulators 82a, 82b receive data from respective mappers 76a, 76b. Modulators 82a, 82b preferably implement QAM modulation. Accordingly, the modulators 82a, 82b generate analog QAM signals, which are communicated to connections COMM1, COMM2 via amplifiers 86a, 86b and transformers T5, T6, respectively.

FIG. 4 is a block diagram illustrating a possible implementation of a receiver, denoted by reference numeral 60'', that can be used in connection with the transmitter 60' (FIG. 3), in order to implement the second embodiment of the space diversity trellis interleaver system.

Generally, the trellis symbol sequence arriving at either trellis decoder alternates between channel 1 and channel 2. Thus, impulse events on channel 1 will only impact every alternate symbol in each trellis decoder. The latency of the trellis decoder is the same as for a single channel. In this configuration, only half of the energy of an impulse event on one channel enters either trellis decoder, and the adverse impulse energy is advantageously spread over twice the number of trellis symbols.

As shown in FIG. 4, the receiver 60'' includes equalizers 98a, 98b that receive the analog signals from connections COMM1, COMM2 via transformers T7, T8 and amplifiers 94a, 94b, respectively.

Multipliers 102a, 102b receive equalized data from the equalizers 98a, 98b, respectively, and combine respective scalar values $s_1$, $s_2$ with the equalized data in order to step down the size of the constellations for comparing them to a uniform slicing grid. Also, this process compresses the noise and normalizes it across channels 1, 2 in order to enable appropriate switching of the convolutional decoders 106a, 106b between the channels. Furthermore, the scalars $s_1$ and $s_2$ allow for different data rates on channels 1 and 2.

During one baud period, as is currently shown in FIG. 4, the data from scaler 102a is communicated to convolutional decoder 106a and subset selector 108a, while data from the scaler 102b is communicated to the convolutional decoder 106b and the subset selector 108b. During the next successive baud period, the output from the scaler 102a is communicated to the convolutional decoder 106b and the subset selector 108a, while the output of the scaler 102b is communicated to the convolutional decoder 106a and the subset selector 108b.

Delay mechanisms 105a, 105b receive the outputs from respective multipliers 102a, 102b and introduce a delay that is generally equivalent to that associated with the convolutional decoders 106a, 106b, so that the data rates at the subset selectors 108a, 108b is consistent and synchronized.

The subset selectors 108a, 108b identify which decoder state was received and offsets or rotates (for two-dimensional CAP or QAM) the receive vectors for final decoding. In the case of pulse amplitude modulation (PAM), the subset selectors 108a, 108b would merely perform a voltage translation (insert an offset).

Demappers 111a, 111b (or slicers or data decoders) receive data from the subset selectors 108a, 108b, respectively, and decode the data. Essentially, the demappers 111a, 111b perform the inverse of the operation that was performed by mappers 76a, 76b (FIG. 3). They map one set of data bits to another set, typically a smaller set of bits. The demappers 111a, 111b can be implemented with, for example, a shell mapper or modulus converter.

In an alternative embodiment, two successive demappers can be implemented in place of each demapper 111a, 111b. One would be used for early slicing to generate ideal references and error signals for adaptive equalization, and a later demapper would operate off of a delayed equalizer sample matching the decoder for Viterbi delay for final error corrected data demapping.

Derandomizers 113a, 113b receive the decoded data from the demappers 111a, 111b and descramble the data based upon a preselected pattern in order to produce descrambled data 115a, 115b for DTE1, DTE2, respectively. The derandomizers 113a, 113b essentially perform the inverse of the randomizing operation that was formerly performed by the randomizers 64a, 64b (FIG. 3).

III. Third Embodiment

Figure 5:
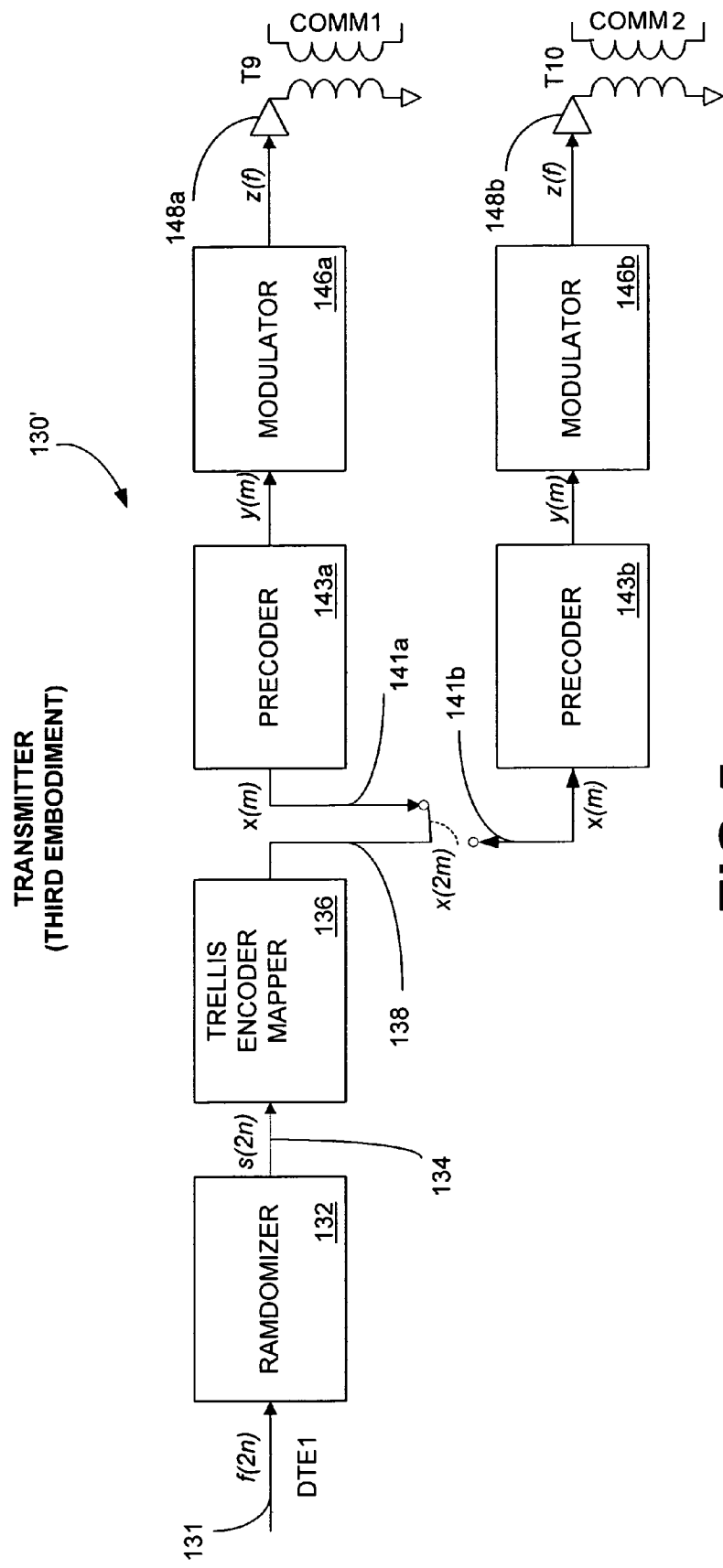
FIG. 5 is a block diagram of a third embodiment of a transmitter that employs the space diversity trellis interleaver system of the present invention.
Figure 6:
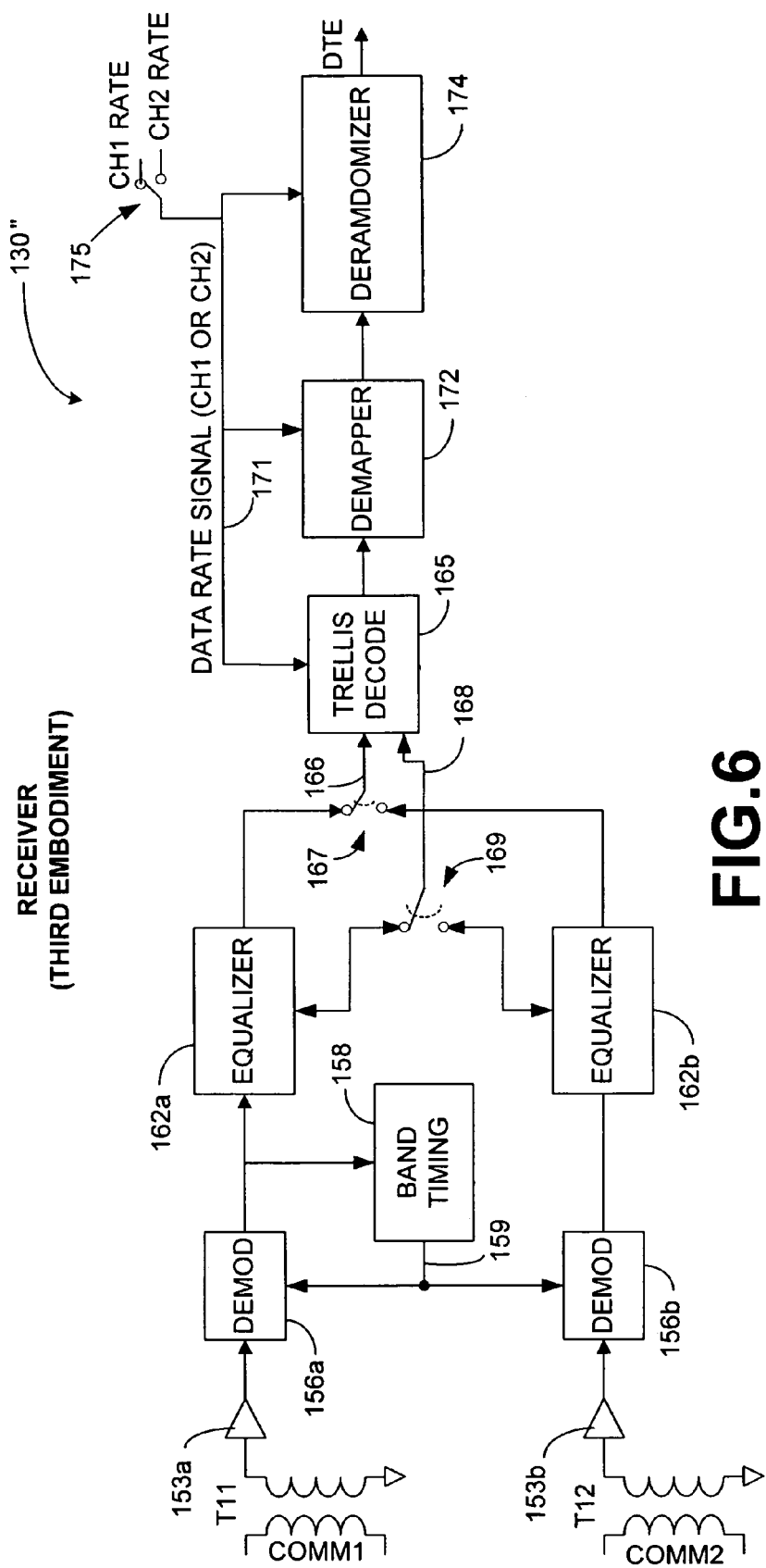
FIG. 6 is a block diagram of a third embodiment of a receiver that is used in connection with the transmitter of FIG. 5.

When operating in dual channel mode to achieve greater reach, the channel symbol rate is low enough that a single encoder can support both channels 1, 2. A single encoder may alternately provide signals to each channel 1, 2, thereby reducing requisite hardware in the transmitter. The third embodiment of the spaced diversity interleaver system of the present invention implements such an encoder and is illustrated by way of block diagram in FIGS. 5 and 6. FIGS. 5 and 6 show a transmitter 130' and a receiver 130'', respectively, for implementing the third embodiment.

With reference to FIG. 5, a randomizer 132 receives a data stream 131 (f(2n)) from the DTE1. The randomizer 132 operates at a symbol rate of $2/T_s$ that is double the channel symbol rate of $1/T_s$. The data rate is the sum of the data rates of the two channels COMM1, COMM2.

In FIG. 5, the trellis encoder/mapper 136 includes, as shown in FIG. 3, the S/P converters 68a, 68b, the convolutional encoders 72a, 72b, and the mappers 76a, 76b. All of the foregoing elements operate at the symbol rate $2/T_s$ so that the trellis encoder/mapper 136 produces two trellis symbol outputs at a symbol rate of $1/T_s$ for each connection COMM1, COMM2.

Precoders 143a, 143b, which are optional but preferred elements, receive symbols alternately during alternate baud periods. The precoders 143a, 143b perform feedback filtering and can be implemented with a finite impulse response (FIR) filter. Many designs of precoders 143a, 143b are well known in the art. An example is described in "G.shdsl: Draft Recommendation for G.shdsl," which describes designs for DSL transmitters and receivers that are currently under consideration as an industry standard by the ITU, which reflects the results of an ITU meeting in Fiji Island from 31 Jan.–4 Feb. 2000, and which is incorporated herein by reference. Thus, both channels are encoded from a single common encoder, resulting in a significant savings in hardware.

Modulators 146a, 146b receive the precoded data from respective precoders 143a, 143b. Preferably, the modulators 146a, 146b implement QAM, so that QAM signals are communicated to communication connections COMM1, COMM2 via respective amplifiers 148a, 148b and respective transformers T9, T10.

An example of a receiver that can be used in connection with the transmitter 130' (FIG. 5) is shown by way of block diagram in FIG. 6 and is generally denoted by reference numeral 130".

With reference to FIG. 6, the receiver 130" includes demodulators 156a, 156b for receiving analog signals from COMM1, COMM2 via transformers T11, T12, and amplifiers 153a, 153b, respectively. The demodulators 156a, 156b preferably implement QAM.

Baud timing mechanism 158 samples the output of demodulator 156a and generates a baud timing signal 159 for both of the demodulators 156a, 156b to keep them in synchronization. Other timing schemes are possible. In fact, each of the demodulators 156a, 156b may have separate baud timing mechanisms.

Equalizers 162a, 162b receive demodulated data from respective demodulators 156a, 156b and operate to equalize the data, as previously described.

A trellis decoder 165, which is preferably operated at a symbol rate of $2/T_s$ alternately receives symbols from equalizers 162a, 162b via switch 167. The trellis decoder 165 provides an update error signal 168 alternately to the equalizers 162a, 162b via switch 169. Switches 167, 169 actuate together. Moreover, the trellis decoder 165, demapper 172, and derandomizer 174 receive a data rate signal 171, corresponding to either channel 1 or 2, to be described later, because these channels could exhibit different data rates. A switch 175 for providing either the channel 1 or channel 2 data rate at a given time is designed to actuate when switches 167, 169 are actuated, so that the appropriate data rate is provided to the trellis decoder 165, demapper 172, and derandomizer 174. The data rate signal 171 can be generated with any suitable mechanism, for example but not limited to, via a DSP that has determined the rates during a training sequence.

Demapper 172 (or slicer) receives data from trellis decoder 165 and performs a decoding operation that is essentially the inverse of that which was performed by the mapper associated with trellis encoding and mapping operation in the transmitter 130' (FIG. 5).

A derandomizer 174 receives the decoded data from the demapper 172 and descrambles the data pursuant to a predefined pattern, which is essentially the inverse of what was performed by the randomizer 132 (FIG. 5).

The foregoing architecture and technique always provides the trellis decoder 165 with symbols alternately between the two channels 1, 2. Thus, noise impulse events on one channel only impact every alternate symbol in the trellis decoder 165. The latency of the trellis decoder 165 is half that of a single channel decoder, because the trellis decoder 165 is running at twice the rate of a single channel decoder. In this configuration, all of the energy of an impulse event on one channel enters the single trellis decoder 165, but it is spread over twice the number of trellis symbols.

IV. Fourth Embodiment

Figure 7:
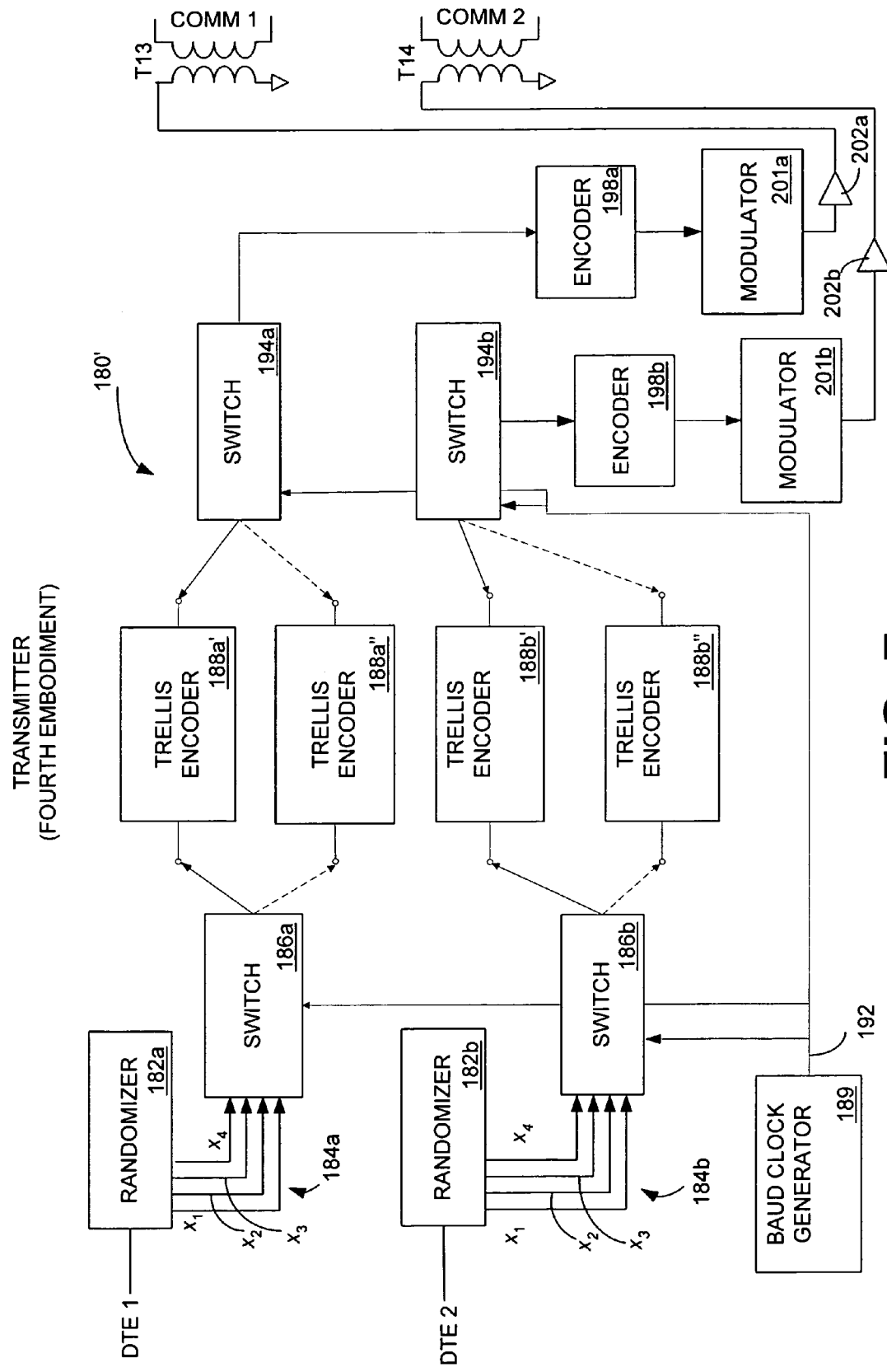
FIG. 7 is a block diagram of the fourth embodiment of a transmitter that employs the space diversity trellis interleaver system of the present invention.
Figure 8:
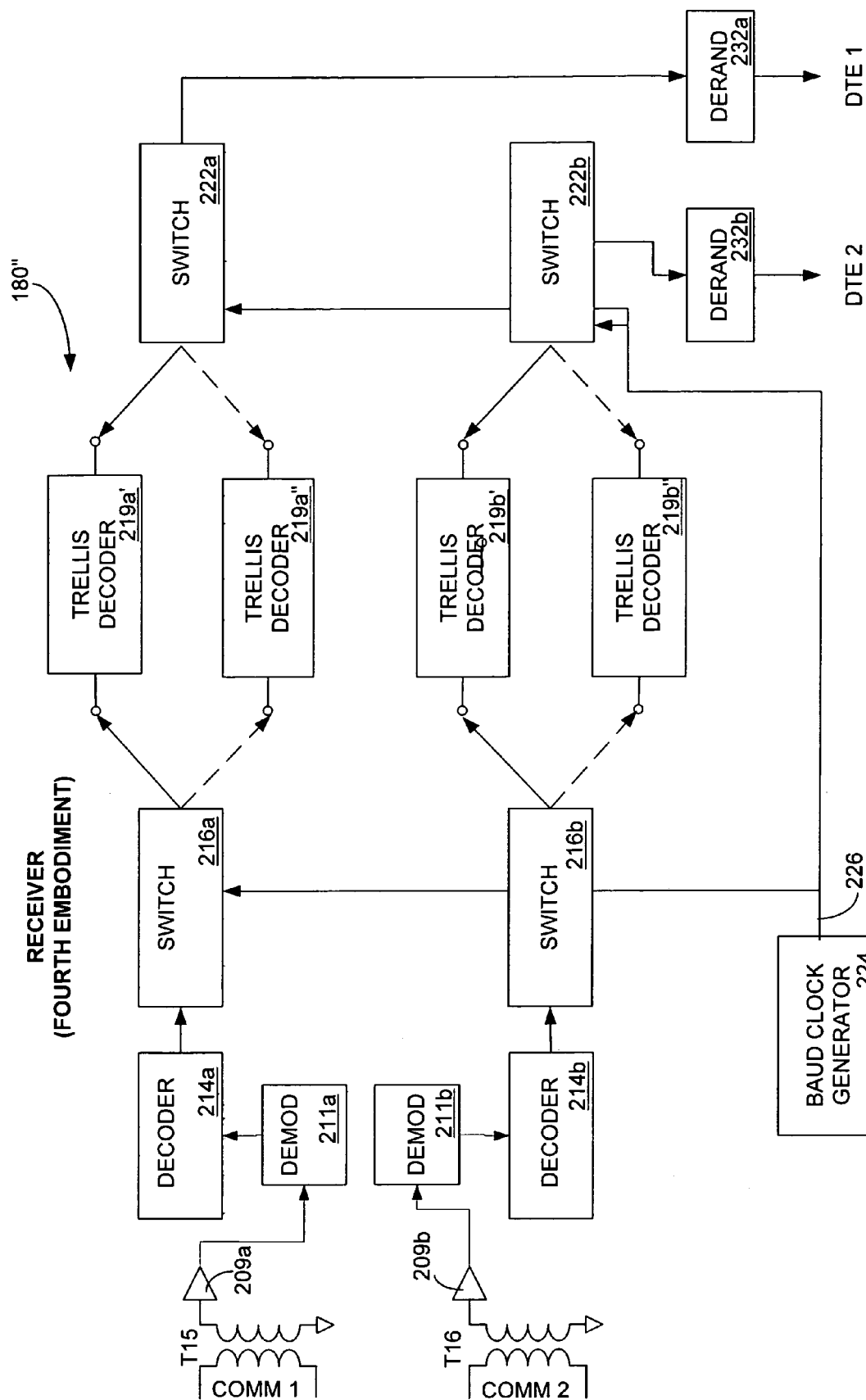
FIG. 8 is a block diagram of the fourth embodiment of a receiver that is used in connection with the transmitter of FIG. 7.

A fourth embodiment of the space diversity interleaver system of the present invention is shown in FIGS. 7 and 8. FIGS. 7 and 8 show a transmitter 180' and a receiver 180", respectively, for implementing the fourth embodiment. The fourth embodiment employs distributed trellis encoding on each channel to further minimize noise. Distributed trellis encoding is described in U.S. Pat. No. 4,677,625 to Betts et al., which is incorporated herein by reference.

The transmitter 180' includes randomizers 182a, 182b for receiving data from DTE1, DTE2, respectively. The randomizers 182a, 182b scramble the bits in a preselected pattern and generate randomized bits $x_1$, $x_2$, $x_3$, $x_4$ in parallel on outputs 184a, 184b, respectively, as is well known in the art. All of the foregoing bits are produced during each baud.

These outputs 184a, 184b are fed by respective switches 186a, 186b to a plurality of trellis encoders. Specifically, during each baud period, switch 186a communicates outputs 184a (bits $x_1$, $x_2$, $x_3$, $x_4$) to either trellis encoder 188a' or trellis encoder 188a", while switch 186b communicates outputs 184b (bits $x_1$, $x_2$, $x_3$, $x_4$) to either trellis encoder 188b' or 188b".

A baud clock generator 189 provides baud clock signals to the switches 186a, 186b as well as to switches 194a, 194b situated at the outputs of the trellis encoders 188a', 188a" and 188b' 188b", respectively. The generator 189 ensures synchronous operation of the foregoing elements. Other clocking schemes are possible, as will be apparent to one with skill in the art.

Each trellis encoder 188 is active when it is addressed by a switch 186. At all other times, the trellis encoders 188 are idle. A specific nonlimiting example of a possible implementation of the trellis encoders 188 is described in U.S. Pat. No. 4,677,625.

Switches 194a, 194b communicate trellis encoder outputs to corresponding encoders 198a, 198b. In the preferred embodiment, the encoders 198a, 198b implement QAM. Encoders 198a, 198b select a point on a preselected signal constellation corresponding to the inputs from respective switches 194a, 194b and generate an in-phase and a quadrature-phase output signal corresponding to the points. These output signals are fed to corresponding QAM modulators 201a, 201b, which generate corresponding analog QAM signals having a baud period equal to the period of the signals generated by baud clock generator 189.

The signals from the modulators 201a, 201b are transmitted over respective communication channels COMM1, COMM2 via amplifiers 202a, 202b and transformers T13, T14, respectively.

Switches 186a, 186b, 194a, 194b are each actuated after each baud, pursuant to the baud clock signal 192 from the baud clock generator 189, so that switches 186a, 194a are connected to the same trellis encoder and so that switches 186b, 194b are connected to the same trellis encoder.

In effect, the bits of several consecutive signals are spaced out over several bauds by the distributed trellis encoders.

At the receiver 180", as illustrated in FIG. 8, the incoming analog signals are received by transformers T15, T16, then amplifiers 209a, 209b, and then demodulators 211a, 211b. In the preferred embodiment, the demodulators 211a, 211b implement QAM and receive the incoming signals via transformers T15, T16 and amplifiers 209a, 209b, respectively. Each of the QAM demodulators 211a, 211b generates an in-phase and a quadrature-phase signal which are fed to respective QAM decoders 214a, 214b. Equalizers (not shown) can be implemented, optionally, after the QAM demodulators 211a, 211b, as is well known in the art.

The QAM decoders 214a, 214b each select a point on the signal constellation closest to the actual point corresponding to the signals received from the QAM demodulators 211a, 211b. The bits corresponding to the points are sent to switches 216a, 216b. During each baud period, switch 216a is connected to either trellis decoder 219a' or trellis decoder 219a", while switch 222a is connected to the same trellis decoder. Furthermore, during each baud period, switch 216b is connected to either trellis decoder 219b' or trellis decoder 219b", while switch 222b is connected to the same trellis decoder. The foregoing switches 216a, 216b, 222a, 222b are each controlled by the baud clock generator 224; which produces a baud clock signal 226 for the respective elements. Thus, all of the binary signals from QAM decoder 214a corresponding to each received QAM signal are sent to one of the trellis decoders 219a', 219a", and all of the binary signals from QAM decoder 214b corresponding to each received QAM signal from QAM demodulator 211b are sent to one of the trellis decoders 219b', 219b".

Derandomizers 232a, 232b receive respective data from respective switches 222a, 222b. The derandomizers 232a, 232b descramble the data and provide the descrambled data to DTE1, DTE2. The derandomizers 232a, 232b reverse the effects of the respective randomizers 182a, 182b (FIG. 7).

It can be seen from the above description that the switches 186a, 186b, 216a, 216b act as multiplexers, while switches 194a, 194b, 222a, 222b act as demultiplexers. The affect of these switching operations is to interleave the data bits at the transmitter on each channel across two bauds and deinterleave these bits at the receiver. Obviously, the trellis encoders 188 can be self-synchronized so that no synchronizing signals are needed between the transmitter and receiver.

In the example illustrated in FIGS. 7 and 8, consecutive bits are interleaved across two baud on each channel by using two distributed trellis encoders and decoders. Obviously, if more encoders and decoders are used the number of bauds over which interleaving occurs increases.

V. Other Possible Variations Of The Various Embodiments

It should be emphasized that the above-described embodiments of the present invention, particularly, any "preferred" embodiments, are merely possible examples of implementations, merely set forth for a clear understanding of the principles of the invention. Many variations and/or modifications may be made to the above-described embodiment(s) of the invention without departing substantially from the spirit and principles of the invention. All such modifications and/or variations are intended to be included herein within the scope of this disclosure and the present invention and protected by the following claims.

A few examples (a nonexhaustive list) of such modifications and/or variations, for illustration purposes, are as follows.

First, for example, while baud clock generators of the several embodiments are described as separate elements, in practice, they may be incorporated in the QAM modulators and demodulators.

Second, modulation schemes other than QAM can be employed in the transmitters and receivers, for example but not limited to, CAP, PAM, PSK, or FSK.

Third, in each of the first, second, third, and fourth embodiments, any number (one or more) of DTEs can be utilized. Further, the present invention can be practiced to interleave symbols from two or more data streams. Finally, the present invention can be practiced in connection with two or more communication connections, and the number of communication connections does not need to be equivalent to the number of data streams.

Fourth, the trellis encoders and decoders can be replaced by other forms of convolutional encoders and decoders, respectively.

Fifth, the space diversity trellis interleaver system is not limited to use in connection with two separate physical wire connections, but can be employed in connection with any type of communication channels, for example but not limited to, a plurality of wireless channels, a plurality of time division multiplexed (TDM) channels on the same physical connection or medium, a plurality of frequency division multiplexed channel (FDM) on the same physical connection or medium, etc.

Sixth, each of the concepts of the first three embodiments may be combined with that of the fourth embodiment to thereby implement both space division encoding with distributed trellis encoding. This would result in embodiments with enhanced resilience to impulse noise.

Seventh, in any or all of the aforementioned embodiments, it is possible to further minimize the effect of impulse noise by introducing a propagation delay among the plurality of channels, for example, between channels 1 and 2. See U.S. Pat. No. 4,630,286, which is incorporated by reference, as well as Section 2.3 of the inventor's contribution entitled, "G.shdsl: 4-Wire Space Diversity Convolutional Encoding" (T1E1.4/2000-087), February 2000, to the International Telecommunications Union (ITU), which is also incorporated by reference, for more details regarding this concept. As an example, in the context of this application, a delay mechanism could be introduced into a transmitter associated with channel 1, so that a noise impulse imposed upon both channels is not correlated across the trellis symbols of both channels. The delay mechanism can be placed, for example, before the modulator. As an example, the delay mechanism could be situated between the switch 16 and either one of the LPFs 25a, 25b in the first embodiment of a transmitter of FIG. 1. As another example, the delay mechanisms could be situated between the trellis encoder mapper 136 and either one of the precoders 143a, 143b in the third embodiment of a transmitter shown in FIG. 5, or alternatively, between one of the precoders 143a, 143b and its respective modulator 146a, 146b in the third embodiment of a transmitter shown in FIG. 5. There are other possiblities.

To compensate for the delay in the transmitter of channel 1, a corresponding delay mechanism could be implemented in the receiver of channel 2, for instance, in a position after the demodulator and prior to an equalizer. This would essentially resynchronize, or align, the data streams, so that both channel 1 and 2 data streams can be reconstructed at the respective receivers. Furthermore, this delay concept can also be combined with the concept of implementing different data transmission rates on channels 1 and 2. In this case, it would be desirable to implement adjustable or programmable delay mechanisms.

At least the following is claimed:
1. A transmitter, comprising:
    (a) first and second convolutional encoders;
    (b) first and second inputs connected to said first and second convolutional encoders respectively;
    (c) first and second outputs; and
    (d) a switch designed to perform the following alternatively during successive baud periods:
        (1) connect said first input to said first output through said first convolutional encoder while connecting said second input to said second output through said second convolutional encoder during said baud period; and
        (2) connect said first input to said second output through said first convolutional encoder while connecting said second input to said first output through said second convolutional encoder.

2. The transmitter of claim 1, wherein said first and second convolutional encoders are trellis encoders.

3. The transmitter of claim 1, wherein said first and second outputs are each wire pairs.

4. The transmitter of claim 1, wherein said convolutional encoders and said switch are implemented with software that is executed by a processor.

5. The transmitter of claim 1, further comprising first and second mappers connected between said first and second convolutional encoders and said first and second outputs, respectively, said first and second mappers configured to receive first and second data symbols, respectively, and define therefor first and second pluralities of bits, respectively, said first and second pluralities being equal or different in number so that data rates associated with said first and second outputs can be defined as equal or different.

6. The transmitter of claim 1, further comprising first and second modulators connected to said first and second convolutional encoders for encoding digital data upon an analog signal for communication onto said first and second outputs, respectively.

7. The transmitter of claim 1, wherein said first and second inputs are connected to the same data terminal equipment.

8. A transmitter comprising:
means for convolutionally encoding each data stream of a plurality to produce a plurality of convolutionally-encoded data streams;
means for interleaving data segments from said convolutionally encoded data streams to produce a plurality of interleaved convolutionally-encoded data streams;
means for transmitting said interleaved convolutionally-encoded data streams onto a plurality of separate communication paths; and
a switching means for alternatively performing steps (1) and (2) hereafter during successive baud periods:
(1) connecting a first input to a first output through a first convolutional encoder while connecting a second input to a second output through a second convolutional encoder during said baud period; and
(2) connecting said first input to said second output through said first convolutional encoder while connecting said second input to said first output through said second convolutional encoder.

9. The transmitter of claim 8, further comprising:
means for receiving first and second symbols from said first and second outputs, respectively; and
means for independently defining first and second data rates for said first and second outputs by defining first and second pluralities of bits for said first and second symbols, respectively, said first and second pluralities being equal or different in number so that said first and second data rates associated with said first and second outputs can be defined to be equal or different.

10. The transmitter of claim 8, wherein said convolutional encoding means performs trellis encoding.

11. The transmitter of claim 8, wherein said separate communication paths are each wire pairs.

12. The transmitter of claim 8, wherein said separate communication paths are each wire pairs.

13. The transmitter of claim 8, wherein said means for convolutionally encoding and said means for interleaving are implemented with software that is executed with a processor.

14. The transmitter of claim 8, further comprising a means for mapping connected between said means for convolutionally encoding and said means for transmitting, said means for mappping configured to receive a data symbol and define therefor a plurality of bits.

15. The transmitter of claim 8, further comprising first and second means for modulating connected to said means for convolutionally encoding for encoding digital data upon an analog signal for communication onto said first and second outputs, respectively.

16. The transmitter of claim 8, wherein said first and second inputs are connected to the same data terminal equipment.

17. A transmitter comprising:
means for convolutionally encoding each data stream of a plurality to produce a plurality of convolutionally-encoded data streams;
means for interleaving data segments from said convolutionally encoded data streams to produce a plurality of interleaved convolutionally-encoded data streams, each convolutionally-encoded data streams divided into interleaved data segments; and
means for transmitting said interleaved convolutionally-encoded data streams onto a plurality of separate communication paths; and
means for independently defining data rates on said paths by separately defining a number of bits for each of said interleaved data segments.

18. A method for transmitting data, comprising the steps of:
convolutionally encoding each of a plurality of data streams to produce a plurality of convolutionally-encoded data streams;
interleaving data segments from said convolutionally-encoded data streams to produce a plurality of interleaved convolutionally-encoded data streams;
transmitting said interleaved convolutionally-encoded data streams onto a plurality of separate communication paths; and
alternatively performing steps (1) and (2) hereafter during successive baud periods:
(1) connecting a first input to a first output through a first convolutional encoder while connecting a second input to a second output through a second convolutional encoder during said baud period; and
(2) connecting said first input to said second output through said first convolutional encoder while connecting said second input to said first output through said second convolutional encoder.

19. The method of claim 18, further comprising the steps of:
receiving first and second symbols from said first and second outputs, respectively; and
independently defining first and second data rates for said first and second output by selectively defining first and second pluralities of bits for said first and second symbols, respectively, said first and second pluralities being equal or different in number so that said first and second data rates associated with said first and second output can be defined to be equal or different.

20. The method of claim 18, wherein said step of convolutional encoding includes the step of performing trellis encoding.

21. The method of claim 18, wherein said communication paths are each wire pairs.

22. The method of claim 18, wherein said step of convolutional encoding is implemented with software that is executed by a processor.

23. The method of claim 18, wherein said first and second inputs are connected to the same data terminal equipment.

24. A method comprising the steps of:
- convolutionally encoding each of a plurality of data streams to produce a plurality of convolutionally-encoded data streams;
- interleaving data segments from said convolutionally-encoded data streams to produce a plurality of interleaved convolutionally-encoded data streams, each convolutionally-encoded data streams divided into interleaved data segments;
- transmitting said interleaved convolutionally-encoded data streams onto a plurality of separate communication paths; and
- independently defining data rates on said paths by separately defining a number of bits for each of said interleaved data segments.

25. The method of claim 24, wherein said step of convolutional encoding includes the step of performing trellis encoding.

26. The method of claim 24, wherein said communication paths are each wire pairs.

27. The method of claim 24, wherein said step of convolutional encoding is implemented with software that is executed with a processor.

28. The method of claim 24, wherein each of said plurality of data streams originates from the same data terminal equipment.

* * * * *

UNITED STATES PATENT AND TRADEMARK OFFICE
CERTIFICATE OF CORRECTION

| | |
|---|---|
| PATENT NO. | : 7,054,377 B1 |
| APPLICATION NO. | : 09/534696 |
| DATED | : May 30, 2006 |
| INVENTOR(S) | : Betts |

Page 1 of 1

It is certified that error appears in the above-identified patent and that said Letters Patent is hereby corrected as shown below:

Column 6, line 55, delete "$(m)$" and insert --(m)--.
Column 6, line 59, delete "$(Y_o)$" and insert --$(Y_o)$--.
Column 6, line 59, delete "$(m)$" and insert --(m)--.
Column 6, line 61, delete "$(Y_o)$" and insert --$(Y_o)$--.

Signed and Sealed this

Twentieth Day of February, 2007

JON W. DUDAS
*Director of the United States Patent and Trademark Office*